(12) United States Patent
Higuchi

(10) Patent No.: US 8,145,815 B2
(45) Date of Patent: Mar. 27, 2012

(54) DATA PROCESSING SYSTEM

(75) Inventor: Ryohei Higuchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 77 days.

(21) Appl. No.: 12/774,463

(22) Filed: May 5, 2010

(65) Prior Publication Data

US 2010/0312935 A1    Dec. 9, 2010

(30) Foreign Application Priority Data

Jun. 4, 2009  (JP) ................................. 2009-134981

(51) Int. Cl.
*G06F 13/00* (2006.01)
(52) U.S. Cl. ............................. 710/112; 710/310; 700/3
(58) Field of Classification Search .................. 710/107, 710/112–114, 116, 119–120, 305–306, 309–312, 710/242–243; 700/3
See application file for complete search history.

(56) References Cited

U.S. PATENT DOCUMENTS

| 6,519,666 B1* | 2/2003 | Azevedo et al. ............... 710/120 |
| 2008/0172510 A1* | 7/2008 | Chen ............................ 710/242 |

FOREIGN PATENT DOCUMENTS

| JP | 2003-167842 | 6/2003 |
| JP | 2008-203989 | 9/2008 |

* cited by examiner

*Primary Examiner* — Clifford Knoll
(74) *Attorney, Agent, or Firm* — McDermott Will & Emery LLP

(57) ABSTRACT

In a hierarchical bus structure employing a fixed-priority bus access arbitration scheme, accurate arbitration of bus access requests can be carried out even in situations where priority levels are updated according to a system operation mode. In each of a plurality of superordinate hierarchical bus circuits, access requests from respective bus masters included in each corresponding bus master group are arbitrated according to priority levels assigned thereto, and based on the result of the arbitration, a priority communication signal PRA/PRB indicating a priority level of each access-request-permitted bus master is fed to a subordinate bus controller. In a subordinate hierarchical bus circuit, under control of the subordinate bus controller, access request arbitration is carried out according to the priority communication signal PRA/PRB to select a superordinate hierarchical bus circuit or bus master having the highest priority level.

3 Claims, 10 Drawing Sheets

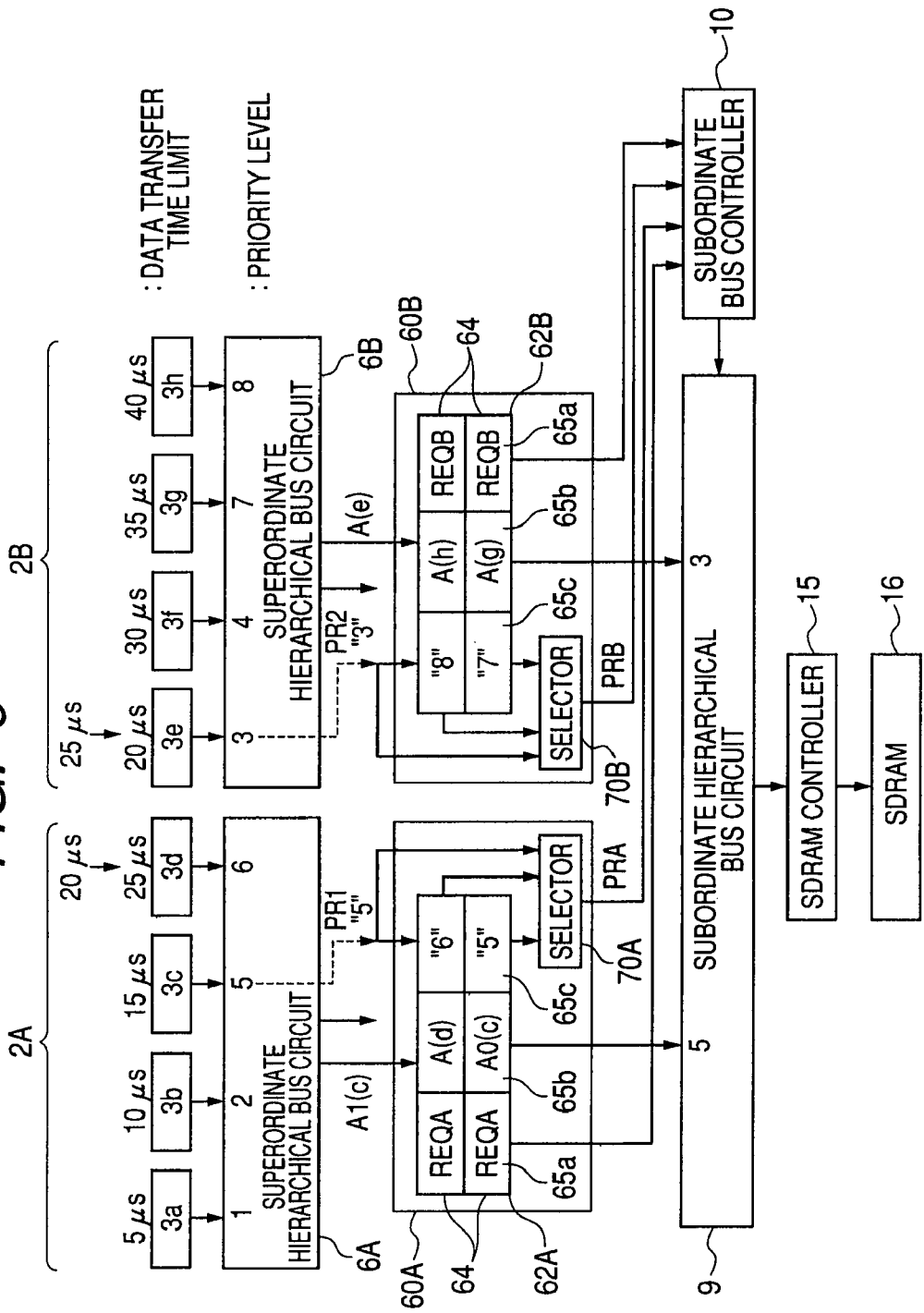

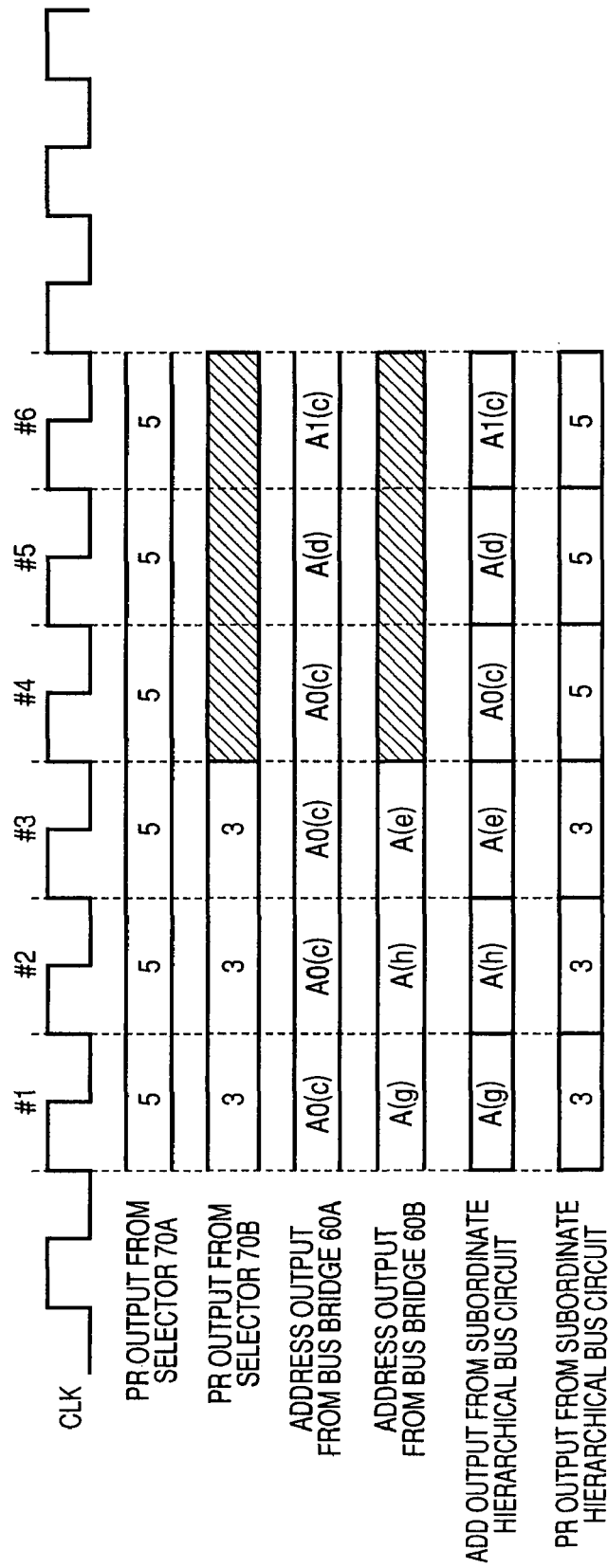

ated in the Patent Document 1 wherein there are provided bus masters for issuing bus access requests and a bus slave for receiving a bus access request from a bus master, a bus access request is selected according to a bus access waiting time length of each bus master. This system configuration is intended to average waiting time lengths of respective bus masters by granting a bus access right to each bus master according to a waiting time length thereof.

DATA PROCESSING SYSTEM

CROSS-REFERENCE TO RELATED APPLICATIONS

The disclosure of Japanese Patent Application No. 2009-134981 filed on Jun. 4, 2009 including the specification, drawings and abstract is incorporated herein by reference in its entirety.

BACKGROUND OF THE INVENTION

The present invention relates to a data processing system for processing information/data, and more particularly to a bus access control technique for realizing higher efficiency in processing operations in a data processing system having a hierarchical bus structure including superordinate and subordinate buses.

In information equipment such as mobile terminal apparatuses and vehicle-mounted information apparatuses, it is required to process audio signal information and image signal information. For processing a plurality of kinds of information in a unified fashion, a multimedia system LSI device (large-scale integrated circuit device) is used in these information equipment. The multimedia system LSI device includes a variety of circuit modules for such purposes as image compression, image data processing, image display, and audio data processing. In common applications, data necessary for processing operations in the circuit modules are stored into a clock-synchronous-type dynamic random access memory (SDRAM), for example. In order to make access to the SDRAM, each circuit module is coupled to the SDRAM through use of internal buses and an SDRAM controller.

Access contention occurs when a plurality of access requests are issued in parallel from a plurality of circuit modules to the SDRAM via the internal buses. A bus controller is provided for arbitration of these competing access requests. As bus access request arbitration techniques, there are known fixed-priority arbitration and round-robin arbitration schemes, for example. In the fixed-priority arbitration scheme, priority levels are preassigned to respective circuit modules, and a bus access right is given to a circuit module having the highest priority level in comparison at the time of access contention. In the round-robin arbitration scheme, priority levels for bus access requests from respective circuit modules are updated sequentially so that the lowest priority level is given to a circuit module after each execution of bus access therefrom.

In the bus access request arbitration schemes mentioned above, however, there may arise a disadvantage that a circuit module having a comparatively lower priority level is not allowed to make bus access for a long period of time to cause an interrupted operation, resulting in a possible decrease in the efficiency of processing.

In Patent Document 1 (Japanese Unexamined Patent Publication No. 2008-203989) and Patent Document 2 (Japanese Unexamined Patent Publication No. 2003-167842), there are disclosed system configurations for adjusting waiting time lengths of respective circuit modules. In the system configuration disclosed in the Patent Document 1 wherein there are provided bus masters for issuing bus access requests and a bus slave for receiving a bus access request from a bus master, a bus access request is selected according to a bus access waiting time length of each bus master. This system configuration is intended to average waiting time lengths of respective bus masters by granting a bus access right to each bus master according to a waiting time length thereof.

In the system configuration disclosed in the Patent Document 2, a bus bridge is disposed between a first bus and a second bus. Each of the first and second buses is coupled with a plurality of agents. A transaction processing count of each agent is monitored in the bus bridge, and a priority level of each agent at the time of issuance of a bus access request therefrom is adjusted according to the transaction processing count thereof. This system configuration is intended to shorten a waiting time length of an agent having a comparatively lower priority level by decreasing a priority level of an agent having a comparatively higher value in the transaction processing count thereof.

Patent Document 1:
Japanese Unexamined Patent Publication No. 2008-203989
Patent Document 2:
Japanese Unexamined Patent Publication No. 2003-167842

SUMMARY OF THE INVENTION

A hierarchical bus structure is employed in a multimedia system LSI device in common applications. The hierarchical bus structure is divided into a superordinate hierarchical bus section and a subordinate hierarchical bus section. A plurality of superordinate hierarchical buses are provided, and a plurality of circuit modules related to a kind of processing are parallel-coupled to each of the superordinate hierarchical buses. For example, a plurality of circuit modules related to image processing are parallel-coupled to a first superordinate hierarchical bus, and a plurality of circuit modules related to image display are parallel-coupled to a second superordinate hierarchical bus. The first and second superordinate hierarchical buses are coupled to a subordinate hierarchical bus. The provision of a plurality of superordinate hierarchical buses as mentioned above is made to reduce load capacity on each superordinate hierarchical bus and to circumvent the need for intricate module-to-bus wirings.

It is assumed here that the fixed-priority arbitration scheme is employed for arbitration of bus access requests in a data processing system. In the following description, a circuit module issuing an access request is referred to as a "bus master", and a circuit module to be accessed from the bus master is referred to as a "bus slave". In the fixed-priority arbitration scheme, priority levels are fixedly assigned to respective bus masters. A procedure for determining priority levels is described blow: In a multimedia system LSI device, it is required for a bus system thereof including an SDRAM to provide real-time response to specific bus masters. The term "real-time response" as used herein signifies that a processing operation after issuance of an access request from a specific bus master until completion of data transfer should always be accomplished within a time limit predetermined in terms of system requirements.

For specific bus masters requiring real-time response, higher priority levels are given to shorter time limits. Conventionally, in a hierarchical bus structure employing the fixed-priority arbitration scheme, bus masters are grouped according to data transfer time limits, and each bus master group is coupled to each superordinate hierarchical bus. In this arrangement, priority levels are fixedly assigned to bus masters in each bus master group, and there are bus masters having the same priority level in different bus master groups. It is therefore required that priority levels for access to a subordinate hierarchical bus should be assigned to respective superordinate hierarchical buses. Thus, priority levels of bus masters are fixedly set up based on combinations of priority levels assigned to superordinate hierarchical buses and priority levels assigned to bus masters in each group.

When access requests of bus masters having the same priority level are issued from the different superordinate hierarchical buses to the subordinate hierarchical bus, an access request from a superordinate hierarchical bus having a higher priority is accepted by the subordinate hierarchical bus.

However, in a multimedia system, a data transfer time limit of each bus master may vary depending on a system operation mode. For instance, at the time of an image display mode changeover, it may become necessary to increase a speed of image data transfer to an SDRAM. In this case, the data transfer time limit of the bus master concerned is shortened.

Here, it is assumed that there is provided a hierarchical bus structure comprising a first superordinate hierarchical bus and a second superordinate hierarchical bus, wherein the first hierarchical bus has a higher priority level than the second superordinate hierarchical bus with respect to access to a subordinate hierarchical bus, i.e., a bus slave. Further, data transfer time limits of bus masters included in the second superordinate hierarchical bus are assumed to be shorter than those of bus masters coupled to the first superordinate hierarchical bus. In the arrangement mentioned above, priority levels are fixedly assigned to the first and second superordinate hierarchical buses with respect to access to the subordinate hierarchical bus. When access requests are issued simultaneously from the first and second superordinate hierarchical buses to the subordinate hierarchical bus, an access request from the first superordinate hierarchical bus having a higher priority level is permitted.

Since the data transfer time limits of the bus masters belonging to the second superordinate hierarchical bus are shorter than those of the bus masters belonging to the first superordinate hierarchical bus, it is practically required that the bus masters issuing access requests through the second superordinate hierarchical bus should take precedence over the bus masters issuing access requests through the first superordinate hierarchical bus. In the conventional fixed-priority arbitration scheme, however, a bus master belonging to the first superordinate hierarchical bus is selected regardless of a longer data transfer time thereof. Consequently, it is not allowed to retain the principle of fixed-priority arbitration that higher priority levels are assigned to bus masters having shorter data transfer time limits, giving rise to the problem that data processing cannot be carried out efficiently.

Further, even in cases where the fixed-priority arbitration scheme is not employed for arbitration of bus access requests in a data processing system having a hierarchical bus structure, a change of effective priority levels assigned to bus masters will cause a similar problem in arbitration of access requests from the superordinate hierarchical buses to the subordinate hierarchical bus.

In the disclosure contained in the Patent Documents 1 and 2 cited above, for bus masters or agents coupled to one superordinate hierarchical bus, priority levels are changed in bus access right assignment according to waiting time lengths or transaction processing counts. However, in these documents, regarding a hierarchical bus structure wherein a plurality of superordinate hierarchical buses are disposed in parallel with respect to a subordinate hierarchical bus, no consideration is given to an arrangement for access arbitration between the superordinate hierarchical buses with respect to the subordinate hierarchical bus.

It is therefore an object of the present invention to provide a data processing system wherein, in a hierarchical bus structure having a plurality of superordinate hierarchical buses disposed with respect to a subordinate hierarchical bus, accurate arbitration of bus access requests can be carried out while retaining the principle of appropriate priority level determination even in situations where effective priority levels assigned to bus masters are changed.

It is another object of the present invention to provide a data processing system wherein, in a hierarchical bus structure employing the fixed-priority bus access arbitration scheme, accurate arbitration of bus access rights can be carried out even in situations where data transfer time limits of bus masters are changed according to a system operation mode.

In accomplishing these objects of the present invention and according to one aspect thereof, there is provided a data processing system wherein priority information used for bus access right arbitration in a plurality of superordinate hierarchical buses is fed to a subordinate hierarchical bus, in which the priority information fed from the superordinate hierarchical buses is used for bus access right arbitration.

Since the priority information used for bus access right arbitration in the superordinate hierarchical buses is fed to the subordinate hierarchical bus as mentioned above, bus access right arbitration can be carried out consistently using the same priority information in both superordinate and subordinate hierarchical sections of a hierarchical bus structure. Hence, accurate arbitration of bus access rights can be accomplished even in situations where priority levels assigned to bus masters coupled to the superordinate hierarchical buses are changed.

Further, since it is allowed to change priority levels assigned to bus masters coupled to the superordinate hierarchical buses, the grouping of the bus masters coupled to the superordinate hierarchical buses can be arranged with a larger degree of freedom. Still further, even in situations where data transfer time limits of bus masters are changed due to a system operation mode changeover, proper priority levels can be assigned to the bus masters to meet the changed data transfer time limits, thereby making it possible to perform accurate arbitration of bus access requests for preventing a decrease in the efficiency of data processing.

In a hierarchical bus structure employing the fixed-priority arbitration scheme in particular, it is possible to retain the principle of appropriate priority level assignment to bus masters even when priority levels of the bus masters are changed. Thus, accurate bus access arbitration based on the changed priority levels can be ensured.

BRIEF DESCRIPTION OF THE DRAWINGS

FIG. 9 is an explanatory diagram showing an exemplary bus access arbitration operation in the data processing system illustrated in FIG. 8; and FIG. 10 is a timing chart showing the bus access arbitration operation in the data processing system in relation to FIG. 9.

DETAILED DESCRIPTION OF THE PREFERRED EMBODIMENTS

Preferred Embodiment 1

Figure 1:
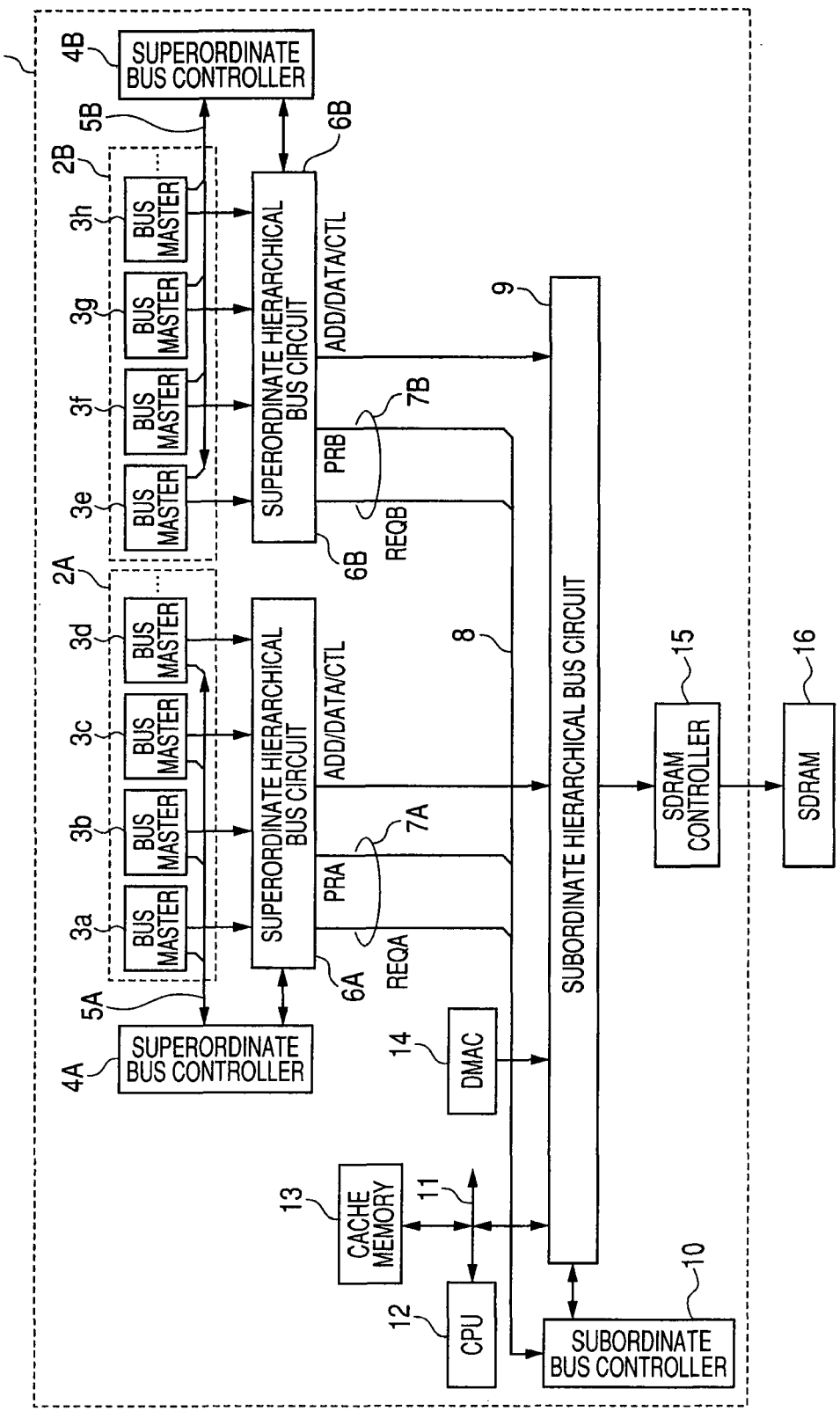
FIG. 1 is a schematic block diagram showing an overall configuration of a data processing system according to a preferred embodiment 1 of the present invention.

Referring to FIG. 1, there is shown a schematic block diagram of an overall configuration of a data processing system according to a preferred embodiment 1 of the present invention. As shown in FIG. 1, the data processing system is configured as a multimedia system LSI device 1, for example. The multimedia system LSI device 1 includes a plurality of bus master groups 2A and 2B to which processing operations are preassigned. The bus master group 2A includes a plurality of bus masters 3*a* to 3*d* and so forth, and the bus master group 2B includes a plurality of bus masters 3*e* to 3*h* and so forth.

The bus master group 2A is in charge of image processing, and the bus master group 2B is in charge of image display, for example. As used herein, the term "image processing" signifies a kind of information processing operation to be performed for extracting information from an image in such a processing step as input image conversion. The term "image display" signifies a kind of display processing operation to be performed for displaying a processed image onto a display unit, including a processing operation to be performed for displaying received image data onto the display unit. To each of the bus master groups 2A and 2B, another kind of processing operation such as image compression processing may be assigned, i.e., the kind of processing operation may be determined according to the kind of data to be processed in the multimedia system LSI device 1.

Each of the bus masters 3*a* to 3*h* carries out a unit process of a kind of processing operation assigned to each of the bus master groups 2A and 2B corresponding thereto respectively. In the bus master group 2A in charge of image processing, each of the bus masters 3*a* to 3*d* carries out such a unit process as filter processing, image superposition, or hue adjustment, for example. In the bus master group 2B in charge of image display, each of the bus masters 3*e* to 3*h* carries out such a unit process as image data arrangement for double-speed presentation of display image data or frequency conversion for image data transfer, for example.

For the bus master group 2A, there are provided a superordinate bus controller 4A and a superordinate hierarchical bus circuit 6A. For the bus master group 2B, there are provided a superordinate bus controller 4B and a superordinate hierarchical bus circuit 6B.

The superordinate bus controller 4A is coupled to each of the bus masters 3*a* to 3*d* and so forth included in the bus master group 2A via a control bus 5A. Bus access requests from the bus masters 3*a* to 3*d* and so forth are subjected to arbitration by the superordinate bus controller 4A. For example, in the superordinate hierarchical bus circuit 6A, an internal selector thereof selects a bus master corresponding to an access request permitted by the superordinate bus controller 4A.

Likewise, the superordinate bus controller 4B is coupled to each of the bus masters 3*e* to 3*h* and so forth via a control bus 5B. Bus access requests from the bus masters 3*e* to 3*h* and so forth are subjected to arbitration by the superordinate bus controller 4B. For example, in the superordinate hierarchical bus circuit 6B, an internal selector thereof selects a bus master corresponding to an access request permitted by the superordinate bus controller 4B.

Under control of the superordinate bus controllers 4A and 4B, priority level communication signals PRA and PRB indicating respective priority levels assigned to access-request-permitted bus masters are fed along with respective access requests REQA and REQB, addresses (ADD), data (DATA: at the time of data writing), and command information (CTL) from the access-request-permitted bus masters.

That is, each of the priority level communication signals PRA and PRB indicating a priority level assigned to each access-request-permitted bus master is fed to a subordinate hierarchical circuit, thereby making it possible to perform accurate arbitration of bus access requests even if a data transfer time limit (priority level) is changed in the bus masters 3*a* to 3*h* and so forth (as will be described in further detail later).

A subordinate hierarchical bus circuit 9 is provided for use in common to the superordinate hierarchical bus circuits 6A and 6B. For the subordinate hierarchical bus circuit 9, there is provided a subordinate bus controller 10. The priority level communication signals PRA and PRB, and the access requests REQA and REQB from the superordinate hierarchical bus circuits 6A and 6B are fed to the subordinate bus controller 10 via a control bus 8 coupled with local control buses 7A and 7B that correspond to the superordinate hierarchical bus circuits 6A and 6B respectively.

Upon receiving the priority level communication signals PRA and PRB, the subordinate bus controller 10 performs bus access request arbitration according thereto. For example, in the subordinate hierarchical bus circuit 9, an internal selector thereof selects an address (ADD), data (DATA: at the time of data writing), and a command (CTL) fed from the superordinate hierarchical bus circuit 6 (6A or 6B) having access permission.

For the subordinate hierarchical bus circuit 9, there is provided an SDRAM controller 15 as a bus slave for controlling access to an SDRAM 16 used as an external main memory (SDRAM: clock-synchronous-type dynamic random access memory or clock-synchronous-type semiconductor memory device). According to the address, data and command fed from the subordinate hierarchical bus circuit 9, the SDRAM controller 15 makes access to the SDRAM 16 in synchronization with a clock signal (not shown) to carry out a transfer (write or read) operation for necessary data. This access control operation of the SDRAM controller 15 is performed in a manner similar to that for access control operation of an ordinary memory controller.

The subordinate hierarchical bus circuit 9 is coupled to a CPU (central processing unit) 12 via a CPU bus 11. On the CPU bus 11, a cache memory 13 is provided for caching data and commands to be used by the CPU 12 for execution of processing.

For the subordinate hierarchical bus circuit 9, there is further provided a DMAC (direct memory access controller) 14. An operation of access to the SDRAM 16 is carried out under control of the DMAC 14 independently of the control of the CPU 12. Thus, in parallel with arithmetic processing in the CPU 12, data transfer is performed between the SDRAM 16 and each bus master.

Figure 2:
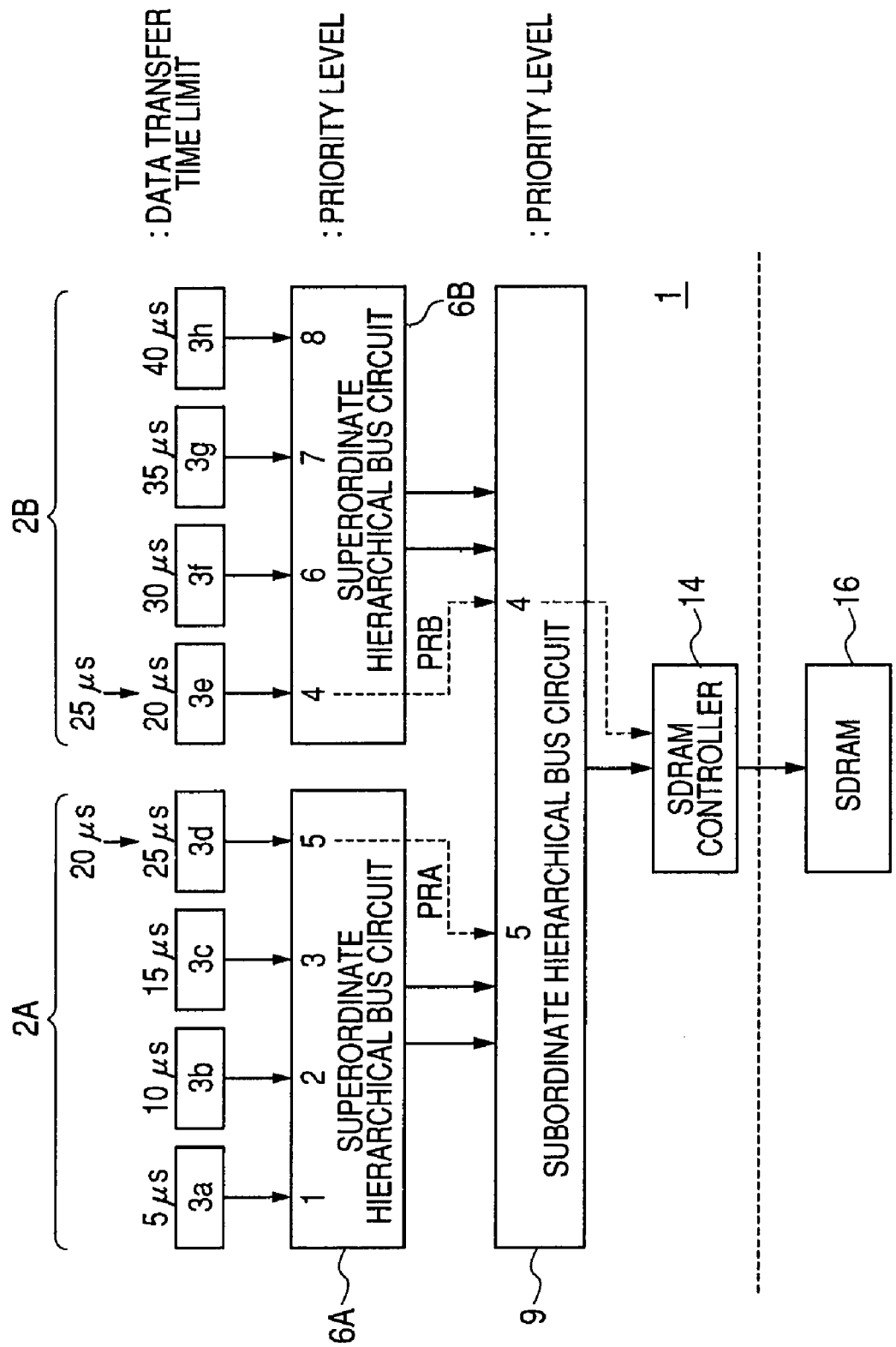
FIG. 2 is an explanatory diagram showing a bus access arbitration operation in the data processing system illustrated in FIG. 1.

FIG. 2 schematically shows a specific example of a bus access arbitration operation in the data processing system according to the preferred embodiment 1 of the present invention. As shown in FIG. 2, the bus masters 3*a* to 3*d* are used in the bus master group 2A, and the bus master 3e to 3h are used in the bus master group 2B, for example. To the bus masters 3a to 3c in the bus master group 2A, time periods of 5 µs, 10 µs, and 15 µs are assigned as data transfer time limits respectively. In accordance with a system operation mode changeover, a data transfer time limit assigned to the bus master 3d is changed from 20 µs to 25 µs. On the other hand, to the bus masters 3f to 3h in the bus master group 2B, time periods of 30 µs, 35 µs, and 40 µs are assigned as data transfer time limits respectively. In accordance with a system operation mode changeover, a data transfer time limit assigned to the bus master 3e is changed from 25 µs to 20 µs.

In prioritization of the bus masters 3a to 3h, higher priority levels are given to shorter data transfer time limits with respect to the whole of the bus masters. Hence, priority levels "1", "2", and "3" are assigned to the bus masters 3a to 3c respectively, and priority levels "6", "7", and "8" are assigned to the bus masters 3f to 3h respectively. To the bus masters 3d and 3e, priority levels "5" and "4" are assigned in accordance with a system operation mode changeover. That is, the bus masters are prioritized in ascending order of data transfer time limits on the basis of the whole of the bus masters, not on the basis of each bus master group. It follows therefore that the priority level of the bus master 3d included in the bus master group 2A may become lower than the priority level of the bus master 3e included in the bus master group 2B in some cases. The bus master priority level setting dependent on a operation mode is carried out as follows, for example: The CPU 12 shown in FIG. 1 calculates a data transfer time limit to be assigned to each bus master according to a operation mode to be taken, and based on the result of the calculation, the CPU 12 sets up priority levels in ascending order of data transfer time limits of the respective bus masters.

Under the conditions illustrated in FIG. 2, it is assumed here that a bus access request from the bus master 3d is recognized in the superordinate hierarchical bus circuit 6A, and a bus access request from the bus master 3e is recognized in the superordinate hierarchical bus circuit 6B. In this case, from the superordinate hierarchical bus circuit 6A, a priority level communication signal PRA indicating the priority level "5" assigned to the bus master 3d is fed to the subordinate hierarchical bus circuit 9. On the other hand, from the superordinate hierarchical bus circuit 6B, a priority communication signal PRB indicating the priority level "4" assigned to the bus master 3e is fed to the subordinate hierarchical bus circuit 9.

In the subordinate hierarchical bus circuit 9, the bus access request from the bus master 3e having the comparatively higher priority level is selected based on the priority communication signals PRA and PRB fed as mentioned above. That is, in prioritization of accesses from the superordinate hierarchical bus circuits 6A and 6B to the subordinate hierarchical bus circuit 9, the superordinate hierarchical bus circuit 6A does not always take precedence over the superordinate hierarchical bus circuit 6B. The priority levels of the respective accesses are judged from the priority communication signals PRA and PRB, and bus access request arbitration is carried out according to the result of the judgment. Thus, in accordance with a system processing operation, the data transfer time limits of the respective bus masters are updated. Even in cases where the priority levels assigned to the bus masters are changed, access requests can be permitted accurately in ascending order of data transfer time limits of the bus masters. In other words, it is possible to retain the principle of fixed-priority bus access arbitration on which bus access rights are arbitrated by assigning higher priority levels to bus masters having shorter data transfer time limits.

For the subordinate hierarchical bus circuit 9, the SDRAM controller 15 is provided as a bus slave coupled to the SDRAM 16. Through the SDRAM controller 15, the SDRAM 16 is accessed for data transfer. Thus, the bus master 3e can transfer necessary data to the SDRAM 16 within a predetermined data transfer time limit.

Figure 3:
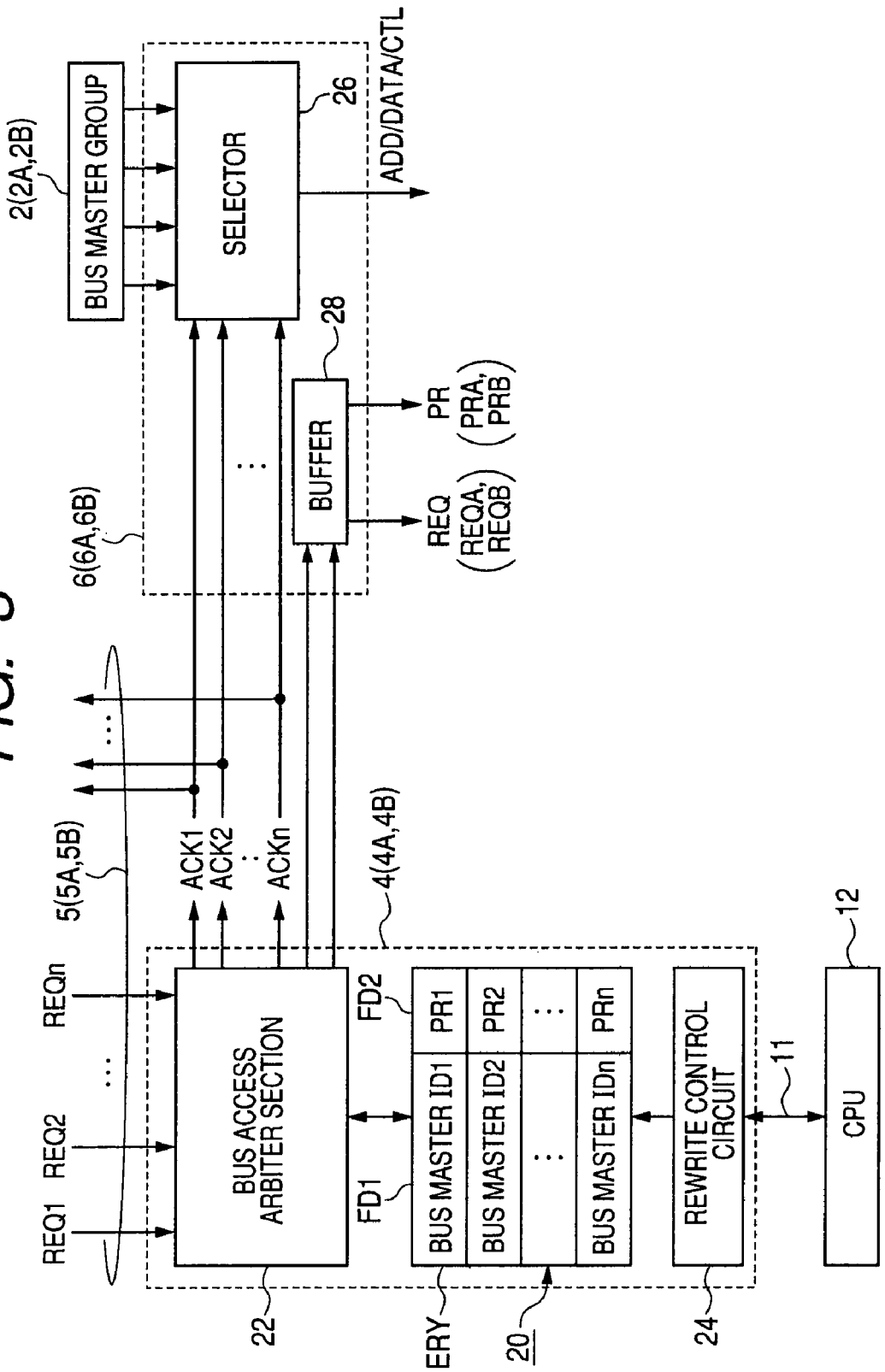
FIG. 3 is a schematic block diagram showing an exemplary configuration of a superordinate bus controller and a superordinate hierarchical bus circuit in FIG. 1.

FIG. 3 schematically shows an exemplary configuration of the superordinate bus controller 4 (4A, 4B) and the superordinate hierarchical bus circuit 6 (6A, 6B). In FIG. 3, since the superordinate bus controllers 4A and 4B are configured in a similar fashion and the superordinate hierarchical bus circuits 6A and 6B are also configured in a similar fashion, the superordinate bus controller 4 represents the superordinate bus controllers 4A and 4B, and the superordinate hierarchical bus circuit 6 represents the superordinate hierarchical bus circuits 6A and 6B.

As shown in FIG. 3, the superordinate bus controller 4 (4A, 4B) includes a register file 20 for containing priority level information of the respective bus masters, a bus access arbiter section 22 for conducting bus access request arbitration by referencing the register file 20 in response to bus access requests REQ1 to REQn from the respective bus masters, and a rewrite control circuit 24 for changing the priority levels of the respective bus masters in the register file 20 according to instructions issued from the CPU 12.

The register file 20 contains entry items ERY arranged for the respective bus masters. Each entry item ERY includes an identification field FD1 for containing a bus master identifier ID indicating each bus master, and a priority level field FD 2 for containing information indicating a priority level assigned to each bus master.

It is to be noted that the register file 20 may be so structured that each entry item ERY is pre-associated with each bus master (a first entry item ERY is pre-associated with the bus master 3a, a second entry item is pre-associated with the bus master 3b, . . . , and so forth) for storing priority level information. Alternatively, the register file 20 may be so structured that each entry item ERY is pre-associated with each priority level for storing a bus master identifier ID indicating each bus master. In practical application of the present invention, the structure of the register file 20 may be determined as required for convenience.

In an example shown in FIG. 3, the register file 20 contains bus master identifiers ID1 to IDn assigned to "n" bus masters, and priority level information PR1 to PRn assigned to the respective bus masters.

On occurrence of bus access request contention in a situation where the bus access arbiter section 22 receives bus access requests REQ1 to REQn from the respective bus masters via the control bus 5 (5A, 5B), the bus access arbiter section 22 makes reference to the register file 20 to determine a bus access request from a bus master having the highest priority level. Then, a bus access acknowledgment ACK is asserted for accepting the bus access request from the bus master having the highest priority level.

In the manner mentioned above, one of bus access acknowledgments ACK1 to ACKn is asserted in the bus access arbiter section 22, and fed therefrom to the bus master concerned via the control bus 5. Upon receiving the asserted bus access acknowledgment ACK, i.e., ACKi (i=one of 1 to n), the bus master concerned issues a data transfer request (data write or read request to the SDRAM) to a superordinate hierarchical bus circuit corresponding thereto. Each of the other bus masters is kept waiting for bus access until the bus access acknowledgment ACKi assigned thereto is asserted.

The rewrite control circuit 24 is used to change the priority level of each bus master in the register file 20 according to a rewrite instruction from the CPU 12. The CPU 12 is coupled to the superordinate bus controller 4 via the CPU bus 11. When a system operation mode is changed to cause the necessity to change the data transfer time limit assigned to one of the bus masters, the CPU 12 rearranges the priority levels of the respective bus masters accordingly. This re-prioritization is carried out as follows, for example: In a table memory, data transfer time limits assigned to the respective bus masters according to system operation modes are stored in correspondence with the respective bus masters. When instructed to perform a operation mode changeover, the CPU 12 makes reference to the table memory according to the operation mode to be taken, and from the table memory, the CPU 12 reads out data transfer time limit information of each bus master. Then, to all the bus masters, priority levels in descending order thereof are assigned according to ascending order of the data transfer time limits that have been read out as mentioned above (higher priority levels are given to shorter data transfer time limits).

When the CPU 12 produces priority level information of the respective bus masters in re-prioritization according to the operation mode to be taken, the CPU 12 stores the thus produced priority level information of the respective bus masters into the register file 20 once. Thereafter, the CPU 12 issues a priority level rewrite instruction to the rewrite control circuit 24 via the CPU bus 11. In addition, to the rewrite control circuit 24, the CPU 12 feeds an address for identifying each bus master having a priority level to be changed (bus master identifier ID), and relevant priority level information. Thus, even in cases where the priority levels of the respective bus masters are changed according to each system operation mode, it is possible to retain the principle of fixed-priority bus access arbitration on which a bus master having the shortest data transfer time limit is prioritized first in access request permission for the respective bus masters.

The superordinate hierarchical bus circuit 6 (6A, 6B) includes a selector 26 for selecting output information from the bus master group 2 (2A, 2B) according to one of the bus access acknowledgments ACK1 to ACKn from the bus access arbiter section 22, and a buffer 28 for feeding, to the subordinate hierarchical bus circuit 9, a bus access request IDQA and a priority level communication signal PRA indicating the priority level of an access-request-permitted bus master.

From the bus master group 2, the selector 26 selects output information of the access-request-permitted bus master corresponding to an asserted one of the bus access acknowledgments ACK1 to ACKn fed from the bus access arbiter section 22. Thus, an address ADD, data DATA, and a command CTL from the access-request-permitted bus master are fed to the subordinate hierarchical bus circuit 9.

In cases where a data read operation for transferring data from the SDRAM (16) to the bus master group 2 is requested, the access-request-permitted bus master concerned outputs an address ADD and a read mode instruction. Then, the selector 26 outputs the address ADD and a command CTL specifying a read mode. After the lapse of a predetermined period of time, read-out data DATA is transferred from the SDRAM to the bus master concerned in the bus master group 2.

From the bus access arbiter section 22, the buffer 28 receives a bus access request and priority information of the access-request-permitted bus master. Through buffering operation, the buffer 28 produces a bus access request REQ (REQA, REQB) and a priority communication signal PR (PRA, PRB) to be fed to the subordinate hierarchical bus circuit 9.

In the exemplary configuration shown in FIG. 3, the selector 26 of the superordinate hierarchical bus circuit 6 is used to select output information from the bus masters included in the bus master group 2. Where the following configuration is adopted, it is not required to provide the selector 26, however: Output sections (bus interface sections) of the bus masters included in the bus master group 2 are parallel-coupled to a superordinate hierarchical bus, and an output of each bus master is enabled when a corresponding one of bus access acknowledgments ACK1 to ACKn is asserted (an acknowledgment ACKi is asserted). Alternatively, the output of each bus master is kept in a high impedance state when the acknowledgment ACKi is negated. In this configuration, the functionality equivalent to that of the selector 26 shown in FIG. 3 is implemented by means of combinational arrangement of the superordinate hierarchical bus included in the superordinate hierarchical bus circuit 6 and the bus interfaces provided at the output sections of the respective bus masters.

Even in cases where the priority levels of the respective bus masters are changed according to each system operation mode, it is possible to feed updated priority information to the subordinate hierarchical bus circuit 9 or bus slave through use of the buffer 28 included in the superordinate hierarchical bus circuit 6 in the configuration shown in FIG. 3.

Figure 4:
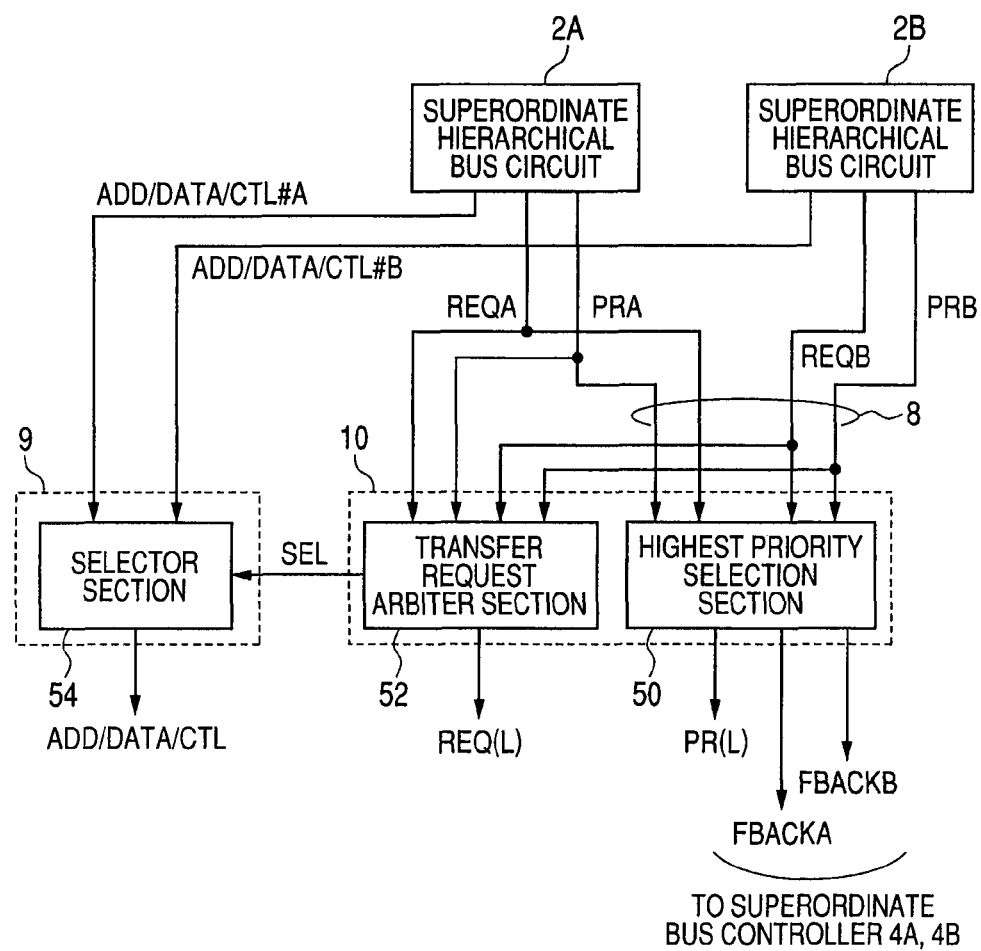
FIG. 4 is a schematic block diagram showing an exemplary configuration of a subordinate hierarchical bus circuit and a subordinate bus controller in FIG. 1.

Bus Controller Configuration:

Referring to FIG. 4, there is shown a schematic block diagram of an exemplary configuration of the subordinate hierarchical bus circuit 9 and the subordinate bus controller 10 in FIG. 1. As shown in FIG. 4, the subordinate bus controller 10 includes a highest priority selection section 50 for selecting the highest priority level according to the priority communication signals PRA and PRB received from the superordinate hierarchical bus circuits 2A and 2B, and a transfer request arbiter section 52 for arbitrating competing access attempts according to the transfer requests REQA and REQB and the priority communication signals PRA and PRB received from the superordinate hierarchical bus circuits 2A and 2B.

When both the access requests (transfer requests) REQA and REQB received from the superordinate hierarchical bus circuits 2A and 2B are asserted, the highest priority selection section 50 selects a priority value indicating a higher priority level through comparison between the priority communication signals PRA and PRB received in parallel, and produces a priority communication signal PR(L) for notification to the bus slave concerned or the subordinate hierarchical bus circuit 9. When either one of the access requests REQA and REQB is asserted, the highest priority selection section 50 selects a corresponding priority communication signal for notification to the bus slave concerned or the subordinate hierarchical bus circuit 9.

Further, from the highest priority selection section 50, final bus access acknowledgments FBACKA and FBACKB produced by the transfer request arbiter section 52 to indicate access-request-permitted bus masters are fed to the superordinate bus controllers 4A and 4B respectively. In the subordinate hierarchical bus circuit 9, a final bus access acknowledgment ACK is produced for the access-request-permitted bus master concerned to allow a transfer operation therefor. Each of the other bus masters is kept waiting until a data transfer operation is allowed by the subordinate hierarchical bus circuit 9. Transfer processing by using the final bus access acknowledgments FBACKA and FBACKB will be described in further detail later.

According to the transfer requests REQA and REQB and the priority communication signals PRA and PRB, the transfer request arbiter section 52 produces a selection signal SEL specifying a superordinate hierarchical bus circuit or bus master having the highest priority level. Further, according to an access request REQ(L) and a corresponding priority communication signal, a priority communication signal PR(L) is produced and fed to the subordinate hierarchical bus circuit 9.

The subordinate hierarchical bus circuit 9 includes a selector section 54, which selects a set of address signal, data and command information "ADD/DATA/CTL#A" received from the superordinate hierarchical bus circuit 2A or a set of address signal, data and command information "ADD/DATA/CTL#B" received from the superordinate hierarchical bus circuit 2B, according to the selection signal SEL fed from the transfer request arbiter section 52. Thus, a set of address, data and command information (ADD/DATA/CTL) is fed to the subordinate hierarchical bus circuit 9 or bus slave.

When both the access requests (transfer requests) REQA and REQB are asserted, a superordinate hierarchical bus circuit or bus master corresponding to the priority communication signal PRA or PRB indicating a higher priority level is selected under control of the subordinate bus controller 10. Thus, even in cases where the priority levels are changed, the subordinate hierarchical bus circuit 9 can select a superordinate hierarchical bus circuit (bus master) having a higher priority level through comparison between the priority communication signals PRA and PRB. In this manner, a proper set of transfer information (address, data and command information) is fed from the selected superordinate hierarchical bus circuit to the subordinate hierarchical bus circuit 9 or bus slave.

Figure 5:
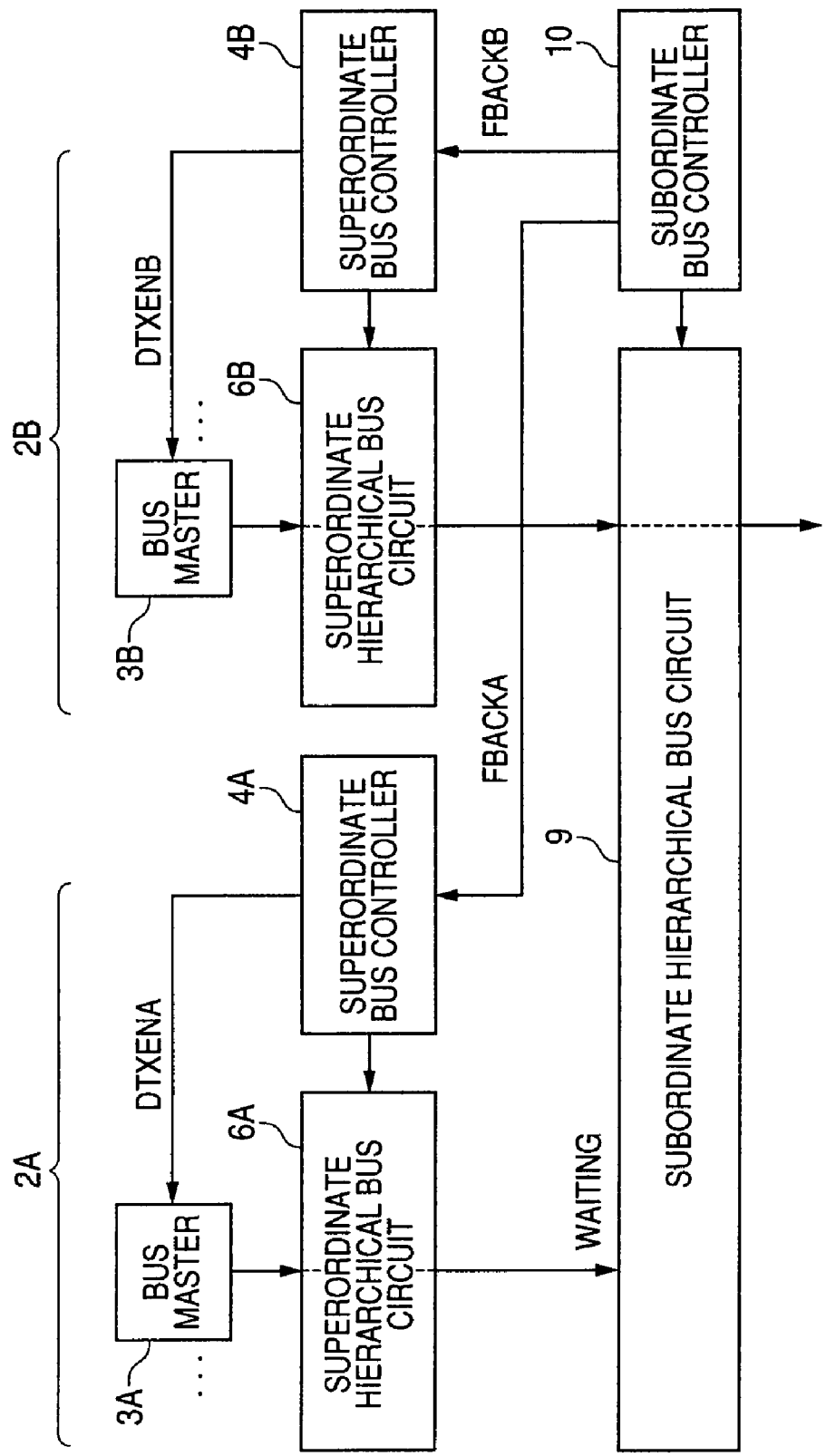
FIG. 5 is a schematic block diagram showing an arrangement for data transfer control in the data processing system according to the preferred embodiment 1 of the present invention.

FIG. 5 schematically shows an arrangement for data transfer control in the data processing system according to the preferred embodiment 1 of the present invention. As shown in FIG. 5, from the highest priority selection section 50 included in the subordinate bus controller 10, final bus access acknowledgments FBACKA and FBACKB are produced and fed to the superordinate bus controllers 4A and 4B respectively.

When the final bus access acknowledgments FBACKA and FBACKB are asserted, the superordinate bus controller 4A and 4B assert data transfer acknowledgments DTXENA and DTXENB for bus masters 3A and 3B corresponding to access requests permitted by the superordinate hierarchical bus circuits 6A and 6B respectively. When the data transfer acknowledgments DTXENA and DTXENB are asserted, each of the bus masters 3A and 3B attempts to carry out a data transfer operation. At this point of time, each of the bus masters 3A and 3B corresponding to an access request permitted by the superordinate bus controller 4 is in a transfer-enabled state according to the bus access acknowledgment ACKi concerned. In a write data transfer operation for transferring data to be written, the remaining data to be written is transferred. In a read data transfer operation, data from the SDRAM (16) is transferred to the corresponding bus master having final access permission.

That is, according to the bus access acknowledgment ACKi, each of the superordinate bus controllers 4A and 4B identifies an access-request-permitted bus master. When the final bus access acknowledgments FBACKA and FBACKB are asserted, the data transfer acknowledgments DTXENA and DTXENB are asserted for each bus master corresponding to the bus access acknowledgment ACKi in an asserted state. At each bus master, a logical multiplication is performed between the bus access acknowledgment ACKi and the final bus access acknowledgment FBACK (FBACKA or FBACKB). Thus, a data transfer operation is allowed for a bus master for which both the ACKi and FBACK are asserted.

While a two-stage hierarchical bus structure comprising the superordinate and subordinate hierarchical bus circuits is adopted in the exemplary configuration described above, there may also be provided a hierarchical bus structure comprising more than two stages. Further, while just two superordinate hierarchical bus circuits are disposed for one subordinate hierarchical bus circuit in the exemplary configuration described above, there may also be provided a modified arrangement wherein more than two superordinate hierarchical bus circuits corresponding to more than two bus master groups are disposed for one subordinate hierarchical bus circuit.

To sum up, in each of the superordinate hierarchical bus circuits, a judgment is formed on priority levels, and in the subordinate hierarchical bus circuit, a bus master having the highest priority level is selected according to priority information supplied thereto.

As described above and according to the preferred embodiment 1 of the present invention, priority information indicating the priority level of each selected bus master is fed downward in the hierarchical circuit structure. Hence, it is not necessarily required to form groups of bus masters having a certain range of data transfer time limit values and couple each of the groups to a particular superordinate hierarchical bus circuit. That is, according to the preferred embodiment 1 of the present invention, it is possible to increase the degree of freedom in bus structure design. Further, even if a data transfer time limit of each bus master is changed due to a system operation mode changeover, it is possible to retain the principle that higher priority levels are assigned to bus masters having shorter data transfer time limits by carrying out proper re-prioritization of the bus masters.

In the configuration shown in FIG. 1, there may also be provided a modified arrangement wherein a bus bridge is disposed between the superordinate hierarchical bus circuit and the subordinate hierarchical bus circuit. In this modified arrangement, the data bus width and data transfer timing can be adjusted by using the bus bridge.

Further, in a read data transfer operation requested by a bus master, an access attempt may be placed in await state in the subordinate hierarchical bus circuit, resulting in the bus master being kept waiting for data transfer access. In consideration of this situation, there may also be provided a modified arrangement wherein, according to a bus access acknowledgment FBACK from the subordinate bus controller 10, the superordinate bus controller 4 preparatively notifies each access-request-permitted bus master of the transfer of requested data from the SDRAM.

Preferred Embodiment 2

Figure 6:
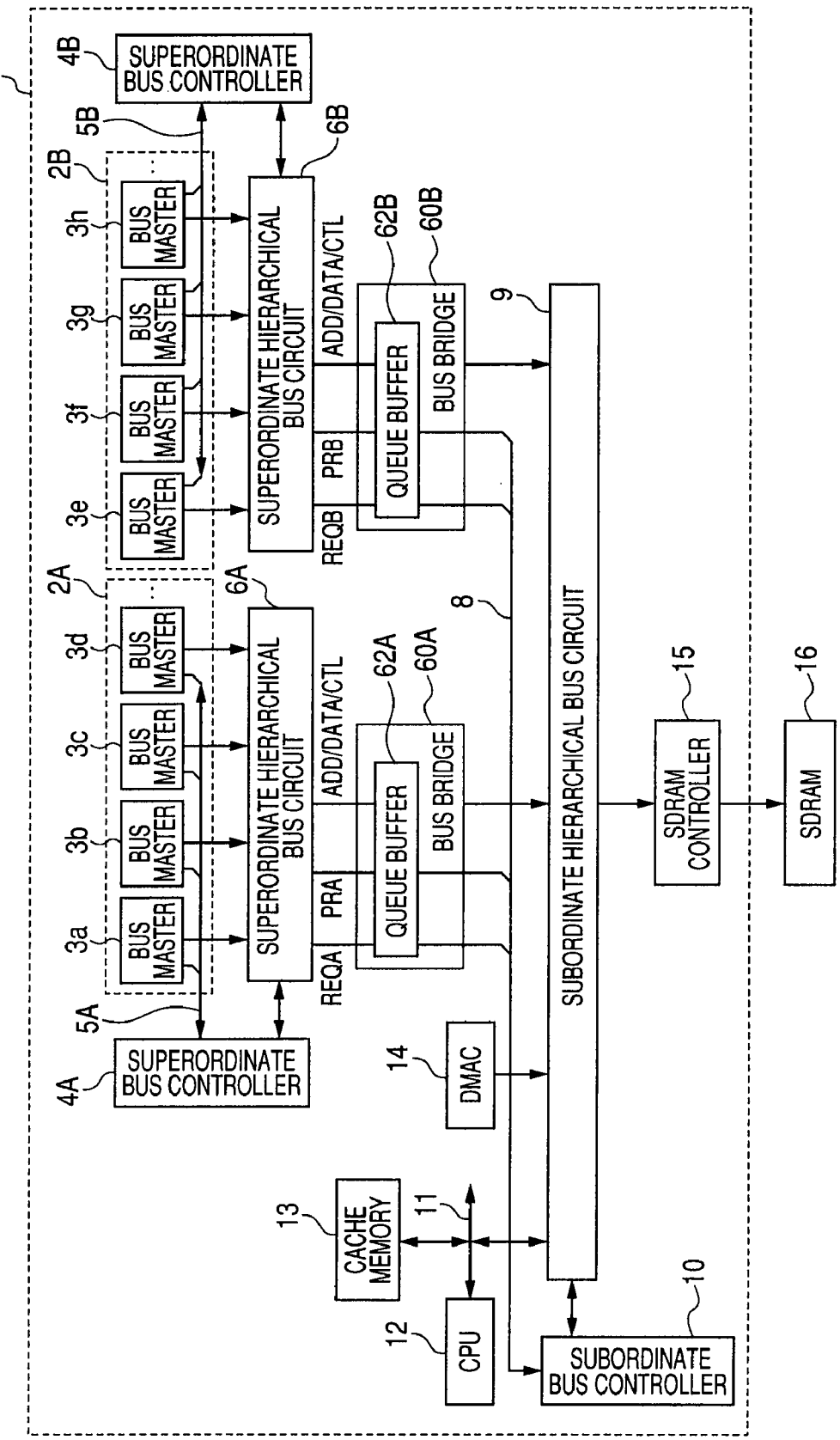
FIG. 6 is a schematic block diagram showing an overall configuration of a data processing system according to a preferred embodiment 2 of the present invention.

Referring to FIG. 6, there is shown a schematic block diagram of an overall configuration of a data processing system according to a preferred embodiment 2 of the present invention. In the data processing system 1 shown in FIG. 6, a bus bridge 60A and a bus bridge 60B are disposed between the superordinate hierarchical bus circuit 6A and the subordinate hierarchical bus circuit 9 and between the superordinate hierarchical bus circuit 6B and the subordinate hierarchical bus circuit 9, respectively. The bus bridges 60A and 60B include queue buffers 62A and 62B, respectively.

On an FIFO (first-in first-out) basis, each of the queue buffers 62A and 62B stores a bus access request REQ (REQA, REQB) and a priority communication signal PR (PRA, PRB) as well as a set of address, data and command information (ADD/DATA/CTL) fed from a corresponding one of the superordinate hierarchical bus circuits 6A and 6B. Each of the queue buffers 62A and 63B comprises a plurality of flip-flop (FF) circuit stages, for example, arranged for queuing bus access requests from a plurality of bus masters.

The other configurational arrangements of the data processing system 1 shown in FIG. 6 are similar to those of the data processing system shown in FIG. 1. In FIG. 6, like reference characters are used to designate like or corresponding parts indicated in FIG. 1 to avoid repetitive detailed description thereof.

Figure 7:
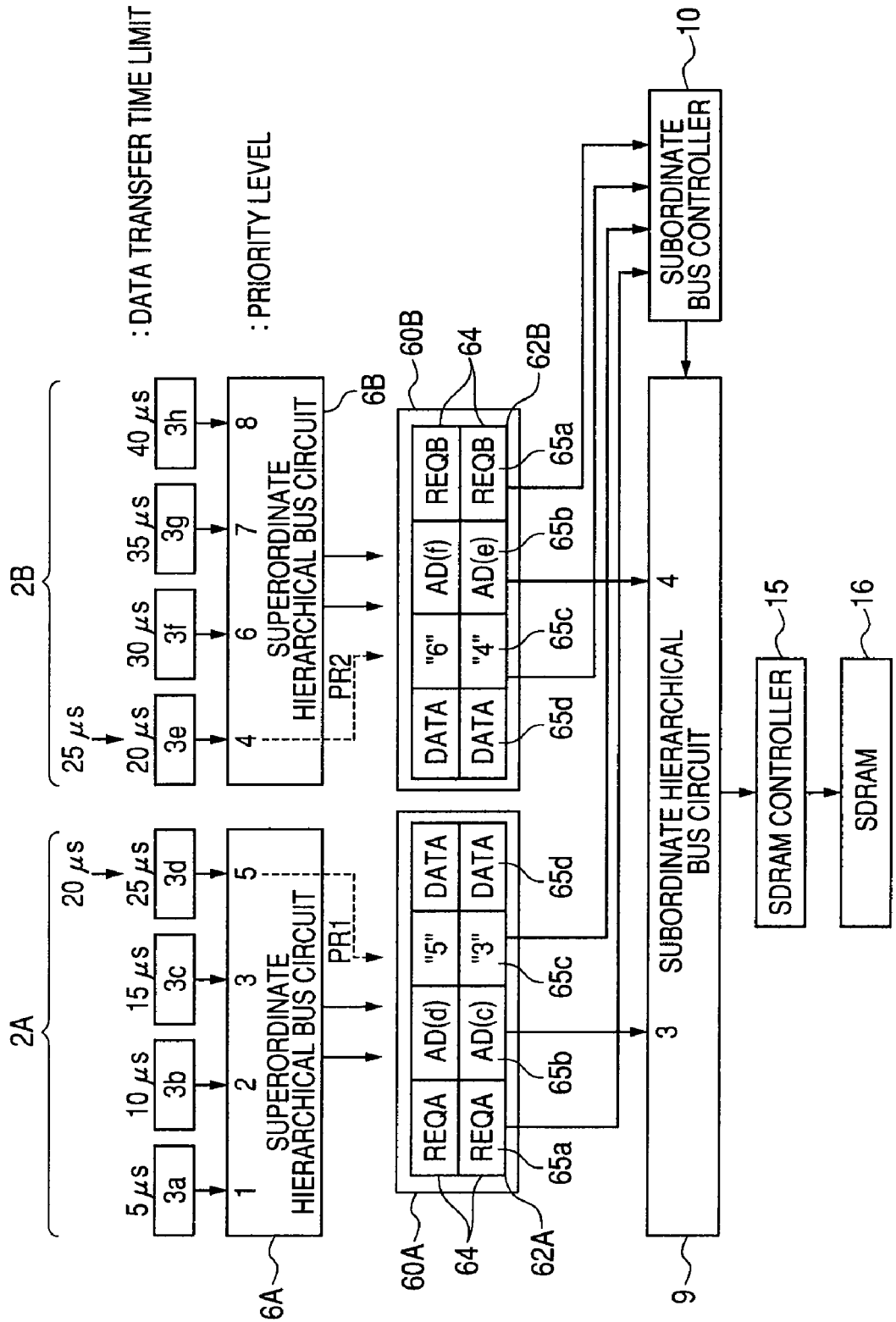
FIG. 7 is an explanatory diagram showing an exemplary access request queuing operation in the data processing system illustrated in FIG. 6.

FIG. 7 shows an access request queuing operation using an exemplary bus bridge arrangement in the data processing system illustrated in FIG. 6. As shown in FIG. 7, each of the queue buffers 62A and 62B of the bus bridges 60A and 60B includes two stages of buffer registers 64. The number of buffer register stages in each of the queue buffers 62A and 62B is to be determined to meet system requirements in practical application.

The bus masters 3a to 3d are provided in the bus master group 2A, and the bus masters 3e to 3h are provided in the bus master group 2B.

Each buffer register 64 includes a bus access request field 65a for containing a bus access request REQ (REQA, REQB), an address field 65b for containing a transfer address, a priority field 65c for containing a priority communication signal, and a data field 65d for containing transfer data. As used herein, the term "transfer address" signifies an address indicating a memory access location in the SDRAM 16, and the term "transfer data" signifies data to be transferred to the SDRAM 16 at the time of a write access operation.

In the queue buffer 62A shown in FIG. 7, a transfer address AD(c), priority level "3" information linked therewith, and transfer data DATA(c) fed from the bus master 3c are stored into the corresponding fields 65b, 65c, and 65d, respectively. Further, a transfer address AD(d), priority level "5" information linked therewith, and transfer data DATA(d) fed from the bus master 3d are stored into the corresponding fields 65b, 65c, and 65d, respectively. For each access attempt in this situation, a bus access request REQA is asserted and stored into the corresponding bus access request field 65a.

In the queue buffer 62B, a transfer address AD(e), priority level "4" information linked therewith, and transfer data DATA(e) fed from the bus master 3e are stored into the corresponding fields 65b, 65c, and 65d, respectively. Further, a transfer address AD(f) and priority level "6" information linked therewith fed from the bus master 3f are stored into the corresponding fields 65b and 65c, respectively. For each access attempt from the superordinate hierarchical bus circuit 6B, a bus access request REQB is asserted and stored into the corresponding bus access request field 65a.

As mentioned above, each buffer register 64 comprises a flip-flop (FF) circuit, for example. When a bus access request and a priority communication signal are fed from each of the superordinate hierarchical bus circuits 6A and 6B, transfer information from each of the superordinate hierarchical bus circuits 6A and 6B is stored into each of the queue buffers 62A and 62B on an FIFO (first-in first-out) basis. In synchronization with each clock signal, the contents that have been stored first into the buffer register 64 of each of the queue buffers 62A and 62B are fed to the subordinate bus controller 10 for bus access request arbitration.

In the arrangement shown in FIG. 7, access requests from the bus masters 3c and 3e are subjected to arbitration in the subordinate hierarchical bus circuit 9. In this example, the bus master 3c has a priority level "3", and the bus master 3e has a priority level "4". Hence, the transfer address AD(c) and the transfer data DATA(c) from the queue buffer 62A are selected, and fed to the SDRAM controller 15 through the subordinate hierarchical bus circuit 9, along with the corresponding priority communication signal. The transfer data DATA(c) is to be written into the SDRAM 16.

For data transfer, there is provided a buffer register for each of write data and read data transfer paths in each of the queue buffers 62A and 62B. That is, a buffer register 65d for storing the transfer data DATA is provided in a write data transfer section. As in the case of address information, transfer data is stored into each buffer register 65d on an FIFO basis. On the other hand, an FIFO buffer register is provided for a read data transfer path. Read-out data through the SDRAM controller 15 is stored into the FIFO buffer register, and transferred to each of the superordinate hierarchical bus circuits 6A and 6B on an FIFO basis. In the case of read data transfer, each bus master requesting a read data transfer operation is identified and enabled according to one of final bus access acknowledgments FBACKA and FBACKB in the subordinate bus controller 10 as described for the foregoing preferred embodiment 1 with reference to FIGS. 4 and 7. Thus, on an FIFO basis, read-out data is transferred properly to each bus master corresponding to the source of access request.

The arrangements described with respect to the foregoing preferred embodiment 1 are therefore applicable to the internal structures of the superordinate hierarchical bus circuits 6A and 6B and the configurations of the superordinate bus controller 4, the subordinate hierarchical bus circuit 9, and subordinate bus controller 10 in the preferred embodiment 2.

The bus access requests REQA and REQB are stored into the queue buffers 62A and 62B respectively in the arrangement shown in FIG. 7. There may also be provided a modified arrangement wherein a bus master identifier ID for identification of each bus master requesting bus access is further stored into each of the queue buffers 62A and 63B, and wherein, using the bus master identifier ID received from the queue buffer, the subordinate bus controller 10 determines a bus master corresponding to a final bus access acknowledgment FBACK, and then the final bus access acknowledgment FBACK is fed to the superordinate bus controller 4 along with the bus master identifier ID. In this case, there may be included such an arrangement that, according to the final bus access acknowledgment FBACK and the bus master identifier ID, the superordinate bus controller 4 identifies the access-request-permitted bus master concerned and sets up an enabled state for receiving data to be transferred.

As described above and according to the preferred embodiment 2 of the present invention, the bus bridge includes a buffering arrangement for storing priority level information to be fed to the subordinate hierarchical bus circuit. Hence, in the hierarchical bus structure wherein the bus bridge is disposed between the superordinate hierarchical bus circuit and the subordinate hierarchical bus circuit, it is also possible to properly feed priority level information from the superordinate hierarchical bus circuit to the subordinate hierarchical bus circuit. Thus, the configuration in the preferred embodiment 2 of the present invention can provide advantageous effects equivalent to those in the foregoing preferred embodiment 1. Further, in the superordinate and subordinate hierarchical bus circuits, bus access arbitration can be carried out in a pipeline-processing manner. That is, the superordinate hierarchical bus circuit can perform arbitration processing progressively without the need to wait for the result of relevant arbitration in the subordinate hierarchical bus circuit, thereby making it possible to increase the speed of processing operation.

Preferred Embodiment 3

Figure 8:
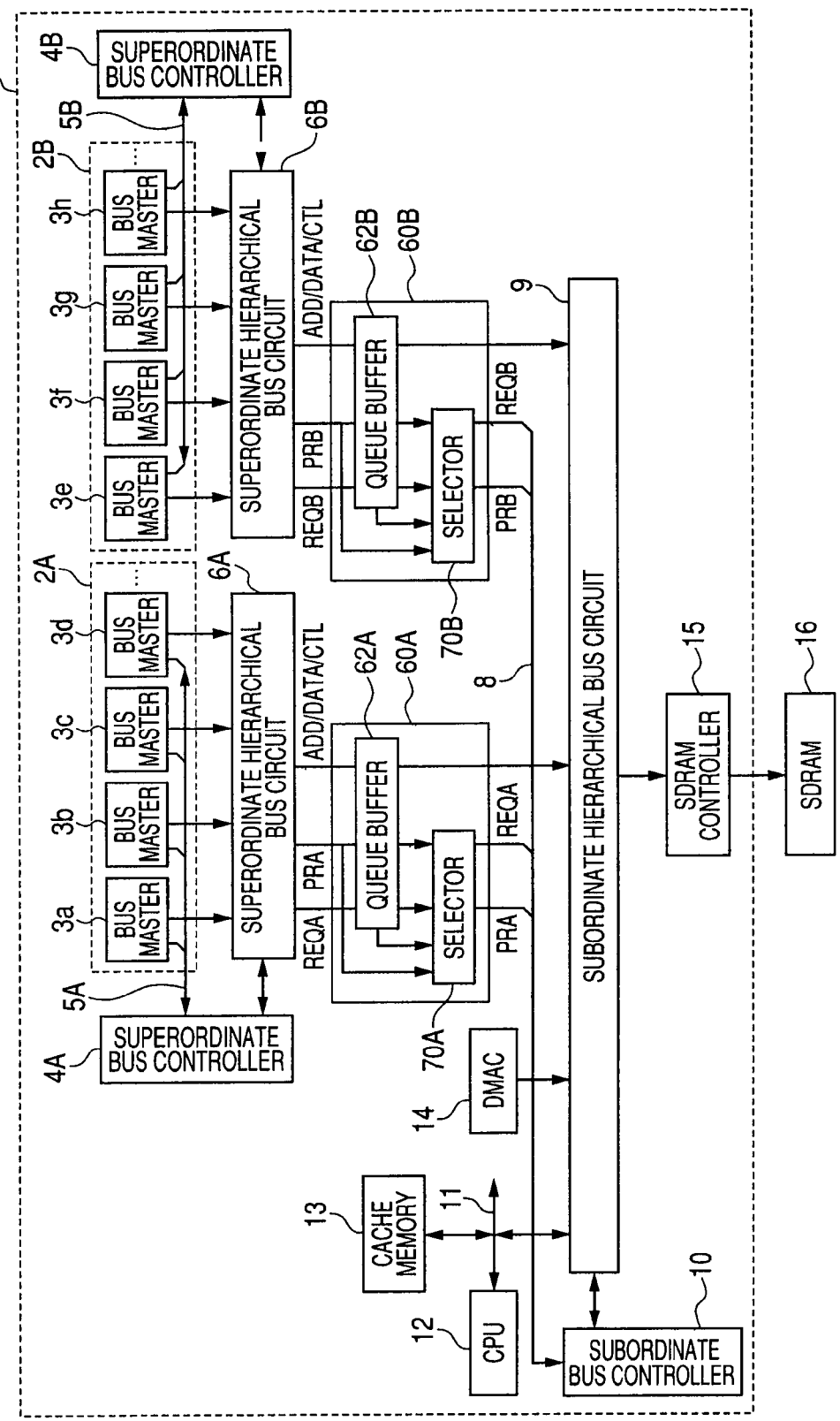
FIG. 8 is a schematic block diagram showing an overall configuration of a data processing system according to a preferred embodiment 3 of the present invention.

Referring to FIG. 8, there is shown a schematic block diagram of an overall configuration of a data processing system according to a preferred embodiment 3 of the present invention. In the data processing system shown in FIG. 8, the bus bridges 60A and 60B further include selectors 70A and 70B, respectively. The selector 70A receives all the priority information stored in the queue buffer 62A and priority communication signals PRA fed from the superordinate hierarchical bus circuit 6A. Using the priority information and priority communication signals PRA thus received, the selector 70A forms a judgment on priority levels to select highest-priority-level information to be output. Likewise, the selector 70B also receives all the priority information stored in the queue buffer 62B and priority communication signals PRB fed from the superordinate hierarchical bus circuit 6B. Using the priority information and priority communication signals PRB thus received, the selector 70B forms a judgment on priority levels to select highest-priority-level information to be output.

In each of the queue buffers 62A and 62B, bus access requests REQ from a plurality of bus masters are stored in linked association with priority information PRi. Each of the selectors 70A and 70B compares all the priority information concerned when the corresponding bus access requests REQ are asserted.

The other configurational arrangements of the data processing system shown in FIG. 8 are similar to those of the data processing system shown in FIG. 6. In FIG. 8, like reference characters are used to designate like or corresponding parts indicated in FIG. 6 to avoid repetitive detailed description thereof.

FIG. 9 schematically shows an exemplary bus access arbitration operation (transfer processing operation) in the data processing system illustrated in FIG. 8. As shown in FIG. 9, the bus masters 3a to 3d are used in the bus master group 2A, and the bus masters 3e to 3h are used in the bus master group 2B.

In the bus master group 2A, priority levels "1", "2", "5", and "6" are assigned to the bus masters 3a, 3b, 3c, and 3d, respectively. On the other hand, in the bus master group 2B, priority levels "3", "4", "7", and "8" are assigned to the bus masters 3e, 3f, 3g, and 3h, respectively. It is assumed here that, in the superordinate hierarchical bus circuit 6A, access requests from the bus masters 3c, and 3d are permitted sequentially, and in the superordinate hierarchical bus circuit 6b, access requests from the bus masters 3g, 3h, and 3e are permitted sequentially.

In the situation mentioned above, for the bus master 3c, a bus access request REQA, a transfer address A0(c), and a priority level "5" are stored into a register 64 of the queue buffer 62A in the bus bridge 60A. For the bus master 3d, a bus access request REQA, a transfer address A(d), and a priority level "6" are stored into another buffer register 64 of the queue buffer 62A. On occurrence of an another access request from the bus master 3c under this condition, a transfer address A1(c) and a priority level "5" are fed from the superordinate hierarchical bus circuit 6A. In this case, all the effective information is stored in the buffer registers 64 of the queue buffer 62A, and the transfer address A1(c) and priority level "5" fed from the superordinate hierarchical bus circuit 6A are placed in a wait state for storing into the queue buffer 62A.

On the other hand, in the bus bridge 60B, a bus access request REQB, a transfer address A(g), and a priority level "7" for the bus master 3g are stored into a register 64 of the queue buffer 62B. Further, for the bus master 3h, a bus access request REQB, a transfer address A(h), and a priority level "8" are stored into another register 64 of the queue buffer 62B. On occurrence of an access request from the bus master 3e in the next cycle, a transfer address A(e) and a priority level "3" fed to the queue buffer 62B are placed in a wait state for storing into the queue buffer 62B.

In the queue buffers 62A and 62B, there are provided data fields for storing data to be transferred as in the foregoing preferred embodiment 2. In FIG. 9, the data fields are not shown for the sake of avoiding complexity in illustration, i.e., only the fields related to address signal transfer paths are shown.

In the situation mentioned above, the selector 70A receives all the effective priority information stored in the queue buffer 62A and all the priority communication signals from the superordinate hierarchical bus circuit 6A, and selects highest-priority-level information to produce a priority communication signal PRA. Likewise, the selector 70B also receives all the priority information stored in the queue buffer 62B (field 65c) and all the priority communication signals (in a wait state) fed from the superordinate hierarchical bus circuit 6B in parallel, and selects highest-priority-level information to produce a priority communication signal PRB. The priority communication signals PRA and PRB thus produced by the selectors 70A and 70B respectively are fed to the subordinate bus controller 10. At this step of operation, the subordinate hierarchical bus circuit 9 performs transfer control of addresses (and data) fed from the bus bridges 60A and 60B.

FIG. 10 shows a timing chart of the bus access arbitration operation in data processing system in relation to FIG. 9. With reference to FIG. 10, the following describes the arbitration operation for access requests shown in FIG. 9.

The queue buffers 62A and 62B of the bus bridges 60A and 60B operate in synchronization with a clock signal CLK.

In cycle #1, the selector 70A receives priority levels "5", and "6". As an indication with a priority communication signal PRA, the selector 70A selects the highest priority level "5", which is fed to the subordinate bus controller 10 along with the corresponding transfer address and data. On the other hand, the selector 70B receives priority levels "7", "8", and "3". The selector 70B selects the highest priority level "3", and produces a priority communication signal PRB for indication thereof to be fed to the subordinate bus controller 10.

Hence, in this case, the priority levels "5" and "3" are assigned to the superordinate hierarchical bus circuits 6A and 6B, respectively. The corresponding transfer addresses (and transfer data) stored in the respective address fields 65b of the queue buffers 62A and 62B are fed to the subordinate hierarchical bus circuit 9 in parallel. Under control of the subordinate bus controller 10, the transfer address A(e) corresponding to the priority level "3" received from the queue buffer 62B is selected in the subordinate hierarchical bus circuit 9 and fed to the SDRAM controller 15.

In the next cycle #2, since the contents of the queue buffer 62A are not issued, the selector 70A selects the priority level "5" as an indication with a priority communication signal PRA and feeds the priority level "5" to the subordinate bus controller 10 in the same manner as in cycle #1. At this step of operation, the selector 70B selects the priority level "3" as an indication of a priority communication signal PRB and feeds the priority level "3" to the subordinate bus controller 10. In synchronization with the clock signal CLK, the queue buffer 62B issues the transfer address and transfer data of the bus master 3g to the subordinate hierarchical bus circuit 9. A priority communication signal PR2 (="3") from the bus master 3e and a transfer address corresponding thereto are stored into a buffer register 64 of the queue buffer 62B.

At this step of operation, according to the priority levels "5" and "3" fed from the bus bridges 62A and 62B, the subordinate hierarchical bus circuit 9 receives the priority level "3" assigned to the next transfer address A(h) in an address field 65*b* in the queue buffer 62B. The transfer address A(h) is fed to the SDRAM controller 15 through the subordinate hierarchical bus circuit 9 along with the corresponding transfer data and priority communication signal PR (="3").

Then, in cycle #3, priority information output from the queue buffer 62A of the bus bridge 60A and priority information output from the superordinate hierarchical bus circuit 6A remain unchanged. Hence, the selector 70A selects information indicating priority "5" for output therefrom in the same manner as in the preceding cycles.

In the bus bridge 60B, the selector 72B selects the priority level "3", and produces a priority communication signal RPB for indication thereof to be fed to the subordinate bus controller 10. Since the priority communication signal RPB from the bus bridge 60B indicates the priority level "3", the transfer address A(e) from the bus bridge 60B is selected and fed to the subordinate hierarchical bus circuit 9 under control the subordinate bus controller 10.

Thus, the feeding of all the transfer addresses stored in the queue buffer 62B of the bus bridge 60B to the subordinate hierarchical bus circuit 9 in cycle #3 is completed, which signifies that all the priority information from the superordinate hierarchical bus circuit 6B have been transferred. Hence, in the subsequent cycles, the priority information in the superordinate hierarchical bus circuit 6B is ignored (on the assumption that no access request is issued from the bus master group 2B in the subsequent cycles).

In cycle #4, the priority level "5" from the queue buffer 62A is selected by the selector 70A and output therefrom. Hence, the transfer addresses A0(*c*), A(d), and A1(*c*) stored in the address fields 65*a* of the queue buffer 62A are selected and fed to the subordinate controller 10 along with the corresponding transfer data in cycles #4, #5, and #5, respectively.

In a situation where the bus master 3*e* having a higher priority level issues an access request as shown in FIG. 9, the access request from the bus master 3*e* is permitted just after waiting for completion of transfer of lower-priority address information stored in advance. Since the access request from the bus master 3*e* having a higher priority level is thus processed subsequently, it is possible to shorten a waiting time required for the bus master 3*e*.

In the above-mentioned arrangement wherein a selector is provided in each bus bridge, the following condition can be circumvented: It is assumed here that transfer information from the bus masters 3*c* and 3*d* is stored into the queue buffer 62A, transfer information from the bus masters 3*g* and 3*h* is stored into the queue buffer 62B, and then the bus masters 3*c* and 3*e* are selected in the superordinate bus circuits 6A and 6B. In this case, if the selectors 70A and 70B are not provided, access request arbitration is performed as described below. After completion of issuance of access requests from the bus masters 3*c*, 3*d*, and 3*c* having priority levels "5", "6", and "5" stored in the bus bridge 60A, transfer addresses and data from the bus masters 3*g* and 3*h* having priority levels "7" and "8" in the bus bridge 60B are subjected to transfer operation. Thereafter, an access request from the bus master 3*e* having a priority level "3" is permitted, and the corresponding transfer address and data are subjected to transfer operation. In this case, the bus master 3*e* having the priority level "3" that is higher than the other priority levels is placed in a wait state for a longer period of time, resulting in difficulty in realization of efficient data transfer. That is, there may arise difficulty in transferring necessary data from the bus master 3*e* within a time limit predetermined for data transfer operation or in achievement of accurate data processing.

It is therefore preferable to provide a selector in each of the bus bridges 60A and 60B as demonstrated in FIGS. 8 and 9. Thus, the highest priority level with respect to the bus bridges is selected and fed to the subordinate hierarchical bus circuit, thereby contributing to reduction in a waiting time for an access request from a bus master having a comparatively higher priority level.

It is to be noted here that priority level selection only is adjusted through use of the above-mentioned arrangement, i.e., an issuance sequence of data transfer requests is not affected by the above-mentioned arrangement. Hence, it is possible to maintain a data transfer sequence required in the data processing system so as to keep a data processing sequence unchanged, thereby ensuring data integrity necessary for accurate data processing.

As described above and according to the preferred embodiment 3 of the present invention, the highest priority level is selected from a plurality of priority levels assigned to bus masters in each superordinate hierarchical bus circuit. Therefore, for an access request from a bus master having a higher priority level, a waiting time thereof due to an access request from a bus master having a lower priority level can be shortened, thereby contributing to an increase in the efficiency of data processing.

In the configurations described so far, priority levels are fixedly assigned to respective bus masters in each operation mode. According to the preferred embodiments 1 to 3 of the present invention, there may be provided a modified configuration for bus access arbitration wherein, in indication of priority information of respective bus masters, the longest waiting time for an access request from a bus master or the longest waiting time in terms of a transaction processing count is fed as the highest-priority-level information. Further, there may also be provided a modified configuration for bus access arbitration wherein, in indication of priority information of respective bus masters, the highest-priority-level information is produced to meet the smallest transaction processing count.

Hence, beside being usable for a fixed-priority bus access arbitration scheme in which priority levels of respective bus masters in a superordinate hierarchical bus circuit are fixedly assigned for each operation mode, the present invention is also applicable to a variable-priority bus access arbitration scheme in which priority levels of respective bus masters are varied depending on issuance conditions of bus access requests.

According to the present invention, in application to a data processing system including a plurality of bus masters and having a hierarchical bus structure wherein access requests to bus slaves are adjusted according to priority levels, bus access arbitration can be carried out accurately based on priority levels for access operations in a hierarchical bus structure. In particular, by applying the present invention to a data processing system having a hierarchical bus structure wherein a fixed-priority bus access arbitration scheme is employed, it is possible to carry out bus access arbitration while retaining the principle of priority setting that higher priority levels are assigned to shorter data transfer time limits accurately even in situations where priority levels are updated according to each system operation mode.

What is claimed is:

1. A data processing system comprising:
a plurality of bus master groups, each including at least one bus master having a priority level for carrying out a preassigned processing operation;

a plurality of first buses, each being disposed in correspondence with each bus master group in an arrangement wherein information from each bus master group is fed via each first bus;

a plurality of first bus controllers, each being disposed in correspondence with each first bus in an arrangement wherein, through arbitration of access requests from each bus master group corresponding thereto in accordance with priority level information, each first bus controller feeds a priority communication signal indicating a priority level of each access-request-permitted bus master;

a second bus disposed in common to the first buses; and a second bus controller disposed in common to the first buses and in correspondence with the second bus in an arrangement wherein, through arbitration of the access requests from each first bus in accordance with each priority communication signal fed under control of each first bus controller, the second bus controller feeds a priority communication signal indicating a priority level of each access-request-permitted bus master to a subordinate hierarchical circuit via the second bus, and wherein the second bus controller feeds transfer information from the access-request-permitted bus master to the subordinate hierarchical circuit via the second bus.

2. The data processing system according to claim 1, further comprising:

a plurality of bus bridges, each being disposed in correspondence with each first bus for adjusting communication between each first bus corresponding thereto and the second bus, wherein each bus bridge includes a queue buffer for successively storing and outputting respective priority communication signals fed under control of each first bus controller corresponding thereto along with transfer information from respective corresponding bus masters.

3. The data processing system according to claim 2, wherein the queue buffer includes a plurality of stages of queue buffer registers, wherein the bus bridge further includes a highest-priority-level information selector for receiving priority communication signals stored in the queue buffer registers and each priority communication signal fed under control of the corresponding first bus controller and for selecting a priority communication signal indicating the highest priority level to be fed to the second bus controller, and wherein the queue buffer successively stores transfer information from respective bus masters and outputs the transfer information to the second bus on a first-in first-out basis.

* * * * *